July 1, 1930. L. WETMORE 1,769,730
EXTRUDING MACHINE HEAD
Filed Sept. 10, 1927
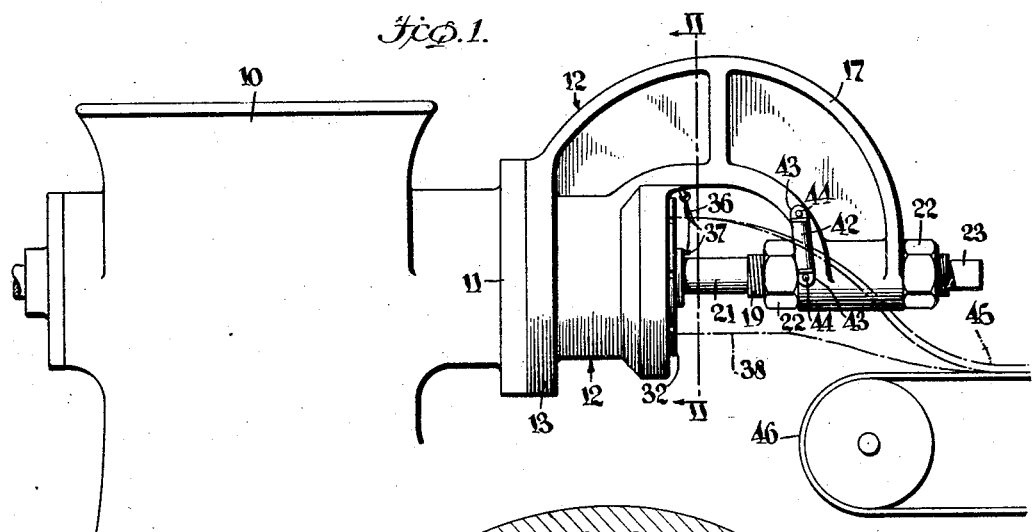
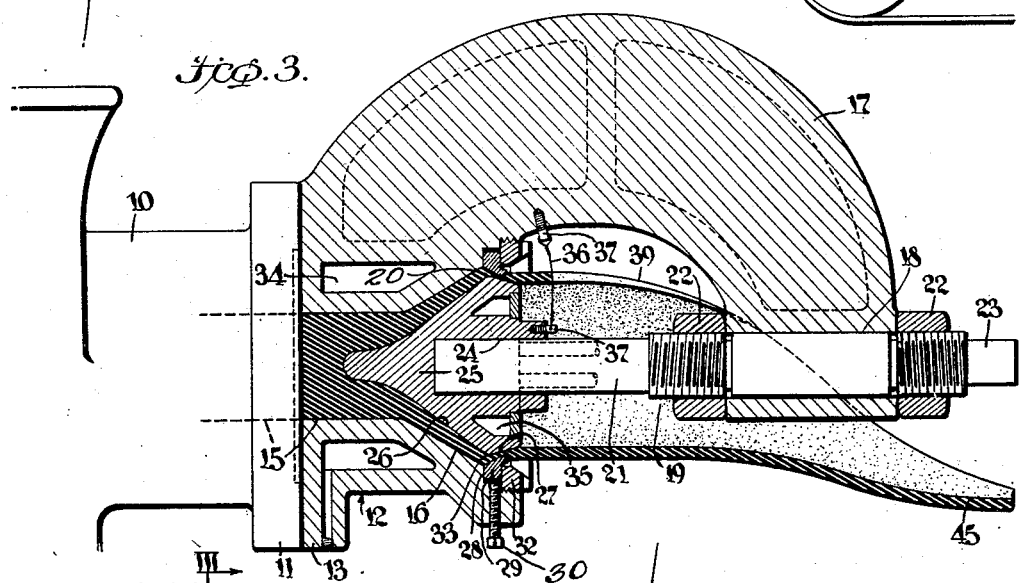
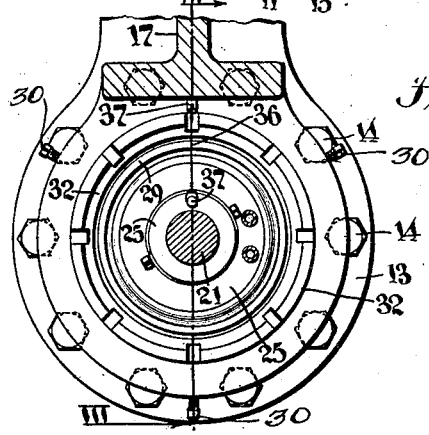
Inventor
Laurence Wetmore,
By
Attorney Patented July 1, 1930

1,769,730

UNITED STATES PATENT OFFICE

LAURENCE WETMORE, OF AKRON, OHIO, ASSIGNOR TO THE GOODYEAR TIRE & RUBBER COMPANY, OF AKRON, OHIO, A CORPORATION OF OHIO

EXTRUDING-MACHINE HEAD

Application filed September 10, 1927. Serial No. 218,806.

The invention relates to extruding machines and it has particular relation to machines of the above designated character which shall be especially applicable for extruding relatively wide strips of rubber compound material to be employed as stock from which rubber heel blanks for shoes are punched.

One object of the invention is to provide an extruding machine having a relatively greater production capacity than the machines heretofore employed.

Another object of the invention is to provide a machine capable of extruding stock having relatively uniform dimensional characteristics, such as the thickness of the strip at various points transversely thereof.

A known method of extruding flat strips of rubber compound material involves the employment of a machine including a so-called flat die. In this machine the upper and lower portions of the die head gradually taper toward a horizontal plane, and the side portions thereof taper outwardly. In this type of head, the central portion of the die is closer to the feeding screw than the portions at opposite sides thereof. It is apparent therefore that the material will be extended more rapidly adjacent the central portion than at the edges. Accordingly, a die having an opening of uniform width will compress the material to a greater degree adjacent the central portion of the die and therefore will extrude a strip of material that is thicker at its central portion than at the edges thereof.

Another type of extruding machine heretofore employed includes a cylindrical head provided with a spider, having attached thereto, the apex of a conical core which cooperates with the head in extruding a tube. The tube is then split longitudinally and is permitted to flatten out on a conveyor belt. In this machine, the spider necessarily sets up a resistance to the uniform movement of the material anterior to the core and thus the rate of production is accordingly limited. The spider likewise causes non-uniform movement of the material adjacent the core which results in the production of a sheet having non-uniform thickness.

The embodiment of my invention herein disclosed comprises a cylindrical head member having a curved beam formed integrally therewith, a portion of which extends into alignment with a central opening in the head member. This end of the beam rigidly supports a core which cooperates with the head in extruding a tube. Such a construction provides an unobstructed passage for extruded material thus dispensing with spiders or like devices which tend to cause flaws or zones of weakness in the extruded product. The tube is split longitudinally by a wire extending between the curved beam and the core, and the edges of the material are separated by a pair of rollers carried by the beam. The material is thus converted into a flat sheet which is received and transported elsewhere by an adjacent conveyor belt.

For a better understanding of the invention, reference may now be had to the accompanying drawing forming a part of this specification, of which:

Fig. 1 is a fragmentary side elevational view of an extruding machine provided with a head embodying one form which my invention may assume;

Fig. 2 is a fragmentary cross-sectional view of the head taken substantially along a line II—II of Fig. 1;

Fig. 3 is a longitudinal cross-sectional view of the head taken substantially in the plane of line III—III of Fig. 2; and Fig. 4 is a fragmentary view illustrating one of the rollers employed in separating the material.

In practicing the invention, an extruding machine 10, is employed having a flanged portion 11 adjacent the delivery end thereof. A head member 12 provided with a flange 13 is bolted to the flange 11, as indicated at 14. A cylindrical opening 15, formed in the head member 12, extends in axial alignment with the feed screw chamber of the extruding machine 10. An inwardly tapering opening 16 merges into the cylindrical opening 15, the two openings forming a continuous unobstructed passage through the head member 12 into the extruding machine 10.

A curved beam 17 is formed integral with the head member 12 at one end thereof, the opposite end of which extends transversely across the extended axes of the openings 15 and 16. This end of the beam 17 is provided with a threaded opening 18 which is concentrically arranged with respect to the axes of the openings 15 and 16. A threaded portion 19 of a rod 21 operatively engages the threaded opening 18 and may be secured in any desired longitudinal position therein by appropriate adjustment of lock nuts 22. The outer end of the rod 21 is provided with a squared portion 23 adapted to be engaged by a wrench for the purpose of adjusting the position of the rod. The opposite end of the rod 21 is rigidly mounted in an opening 24 formed in the central portion of a core member 25 that is disposed within the head 12. The core 25 comprises an inwardly tapering surface 26 and an outwardly tapering surface 27.

An annular recess 28 is formed in the head member 12 adjacent the outer extremity of the tapered surface 16 thereof. A ring 29 having a diameter less than the diameter of the recess is loosely mounted therein and is secured in adjusted positions by means of set screws 30. A second threaded ring 32 is secured to a portion of the head member 12 and provides a positive securing means for rigidly maintaining the ring 29 in adjusted position within the recess 28. The inner surface 33 of the ring 29 is tapered in a direction opposite to the slope of the surface 16 of the head member 12, the minimum diameter of the surface 33 being approximately equal to the maximum diameter of the core 25. When in operative position, the core 25 is so positioned that its portion 20 of greatest diameter is between the tapering surfaces 16 and 33. When it is desired to decrease the thickness of the material extruded, the core 25 is moved in a direction away from the tapering surface 16.

The head member 12 and core 25 each are provided with concentric annular chambers 34 and 35 respectively adapted to be supplied with fluid for heating or cooling the apparatus, depending upon the prevailing conditions of operation.

Opposite ends of a steel wire 36 are fastened in openings in the ends of screws 37, one of which is threaded into an opening in a portion of the core 25 and the other into an opening in the curved beam 17 adjacent its connection with the head member 12. The wire 36 severs the tube 38 longitudinally thereby forming edges 39 which engage rollers 42 arranged on opposite sides of the beam 17. The rollers 42 are mounted between brackets 43, secured to the beam 17 by means of screws 44. The material thereafter assumes the configuration of a flat sheet 45, in which form it is received and transported by a suitable conveyor system 46.

It is apparent that the movement of the material within the head 12 is uniformly effected by the configuration of all of the elements of the extruding apparatus, thus permitting a uniform rate of movement of the material in all localities. Accordingly a sheet of material of any desired thickness may be extruded by the machine when the relative positions of the ring 29 and the core 25 are properly adjusted.

Although I have illustrated but one form which my invention may assume and have described in detail but a single application thereof, it will be apparent to those skilled in the art that it is not so limited, but that various minor modifications may be made therein without departing from the spirit of my invention or from the scope of the appended claims.

What I claim is:

1. An extruding machine head comprising a member having an opening therein, a support projecting from the member externally of the opening and a core for the opening secured to the support.

2. An extruding machine head comprising a member having an opening therein, a curved beam projecting from a portion of the member adjacent the opening and a core for the opening secured to the beam.

3. An extruding machine head comprising a member having an opening therein, a curved beam projecting from the member adjacent the opening, a rod supported by the beam and a core for the opening mounted upon the rod.

4. An extruding machine head comprising a member having an opening therein, a ring mounted adjacent the opening, a core extending within the ring, and means for connecting the core and the member externally of the ring.

5. An extruding machine head comprising a member having an opening therein, a support projecting externally from the member, a core for the opening mounted on the support and means for splitting the extruded material longitudinally.

6. An extruding machine head comprising a member having an opening therein, a support projecting externally from the member, a core for the opening mounted on the support and a wire secured to the support and the core for splitting the extruded material.

7. An extruding machine head comprising a member having an opening therein, a support projecting externally from the member, a core for the opening mounted upon the support, means for splitting the extruded material longitudinally and a pair of rollers mounted on opposite sides of the support for separating the edges of the material.

8. An extruding machine head comprising a member having an inwardly tapering opening therethrough, an oppositely tapering ring mounted at the outer edge of the first mentioned tapering portion and a core adjustably mounted between the ring and the tapering portion of the member.

9. An extruding machine head comprising a member having an opening of decreasing cross-sectional area in opposite directions from a common cross-sectional plane, a correspondingly tapered core for the opening and means for adjustably mounting the core in the opening.

10. An extruding machine head comprising a member having an opening therein and a core for the opening supported externally of the opening.

11. An extruding machine head comprising a member having an opening therein and an externally supported core projecting within the opening to form an unobstructed substantially annular extruding passage.

12. An extruding machine head having an opening therein, a ring mounted adjacent the opening, a core projecting within the ring, and means for adjusting the ring with respect to the core.

13. An extruding machine head comprising a member having an inwardly tapering opening therein, a correspondingly tapered core for the opening, a ring mounted at the outer edge of the tapered opening, and means for adjusting the ring transversely of the core.

14. An extruding machine head comprising a member having an inwardly tapering opening therethrough, an oppositely tapered ring mounted at the outer edge of the tapering opening, a core adjustably mounted substantially co-axially of the ring and the tapering portion of the member, and means for adjusting the tapered ring transversely of the core.

In witness whereof, I have hereunto signed my name.

Signed at Alameda, in the county of Alameda, and State of California, this 29th day of August, 1927.

LAURENCE WETMORE.